US010554893B2

(12) United States Patent
Takayanagi

(10) Patent No.: US 10,554,893 B2
(45) Date of Patent: Feb. 4, 2020

(54) IMAGE STABILIZATION APPARATUS AND CONTROL METHOD THEREFOR, IMAGE CAPTURING APPARATUS, AND STORAGE MEDIUM

(71) Applicant: CANON KABUSHIKI KAISHA, Tokyo (JP)

(72) Inventor: Wataru Takayanagi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 15/874,094

(22) Filed: Jan. 18, 2018

(65) Prior Publication Data
US 2018/0213155 A1    Jul. 26, 2018

(30) Foreign Application Priority Data

Jan. 20, 2017  (JP) ................................. 2017-008787

(51) Int. Cl.
*H04N 5/232*  (2006.01)
*G06T 5/00*   (2006.01)

(52) U.S. Cl.
CPC ......... *H04N 5/23287* (2013.01); *G06T 5/006* (2013.01); *H04N 5/23251* (2013.01)

(58) Field of Classification Search
CPC ........... H04N 5/23287; H04N 5/23254; H04N 5/23258; G06T 5/003; G06T 5/006
See application file for complete search history.

(56) References Cited

U.S. PATENT DOCUMENTS

| 2013/0163084 A1* | 6/2013 | Miyazawa | G02B 27/64 359/554 |
| 2014/0354834 A1* | 12/2014 | Narita | H04N 5/23287 348/208.4 |
| 2016/0196639 A1* | 7/2016 | Shin | G06T 5/003 382/201 |

FOREIGN PATENT DOCUMENTS

JP    2012-103741 A    5/2012

* cited by examiner

*Primary Examiner* — Christopher K Peterson
(74) *Attorney, Agent, or Firm* — Cowan, Liebowitz & Latman, P.C.

(57) ABSTRACT

An image stabilization apparatus includes an acquisition unit configured to acquire information about a lens, a motion vector detection unit configured to detect a motion vector from a plurality of images captured by an image capture unit for capturing an object image, and a calculation unit configured to calculate an image blur correction amount for correcting an image blur, on the basis of the motion vector detected by the motion vector detection unit, and a shake of an image capturing apparatus detected by a shake detection unit for detecting the shake of the image capturing apparatus. The calculation unit changes weights applied to the motion vector and the shake of the image capturing apparatus for calculation of the image blur correction amount, on the basis of information related to perspective of the lens acquired by the acquisition unit.

12 Claims, 13 Drawing Sheets

IMAGE STABILIZATION APPARATUS AND CONTROL METHOD THEREFOR, IMAGE CAPTURING APPARATUS, AND STORAGE MEDIUM

BACKGROUND OF THE INVENTION

Field of the Invention

The present invention relates to technologies for correcting a blur in an image captured by an image capturing apparatus.

Description of the Related Art

There are known techniques of detecting a camera shake, etc., of an image capturing apparatus, and correcting an image blur caused by the shake. Among such techniques of correcting an image blur is optical image stabilization, which is a technique of, in response to a detected shake, driving an optical lens such that the shake is cancelled, and thereby correcting an image blur. Another one is electronic image stabilization, which is a technique of, in response to a detected shake, extracting a portion of successive images captured by an image capturing device, and correcting an image blur by projection transform. Still another one is image capturing device image stabilization, which is a more recent technique of, in response to a detected shake, mechanically moving an image capturing device such that the shake is cancelled, and thereby correcting an image blur.

Among techniques of detecting a shake are a technique of detecting a shake of an image capturing apparatus itself using an angular velocity sensor or an acceleration sensor, and a motion vector technique of calculating and predicting a shake of an image capturing apparatus using a motion vector calculated from successive images captured by an image capturing device.

Meanwhile, it is known that distortion aberration caused by a lens distorts a periphery of an image, and also affects a motion vector detected from that image, resulting in a decrease in the accuracy of the motion vector. For example, Japanese Patent Laid-Open No. 2012-103741 discloses a technique of efficiently performing a plurality of different image correction techniques in order to avoid the influence of distortion.

In recent years, ultra wide-angle lenses have been particularly used as an interchangeable lens, etc., which cause great perspective that cannot be corrected by the above distortion correction technique. Such great perspective has a significant influence on motion vector detection, and is also known to affect the stability and performance of image stabilization.

Some of ultra wide-angle lenses that can be mounted on interchangeable-lens camera systems have begun to cover a wider angle of view than ever before. For fixed-lens cameras, ultra wide-angle lenses may also be employed. When such a lens is used, perspective occurs, depending on the position where incident light forms an image. However, the conventional technique disclosed in Japanese Patent Laid-Open No. 2012-103741 above cannot correct distortion caused by perspective, resulting in a decrease in the accuracy of a motion vector. This leads to a problem that image stabilization is unstable.

SUMMARY OF THE INVENTION

With the above problem in mind, the present invention has been made. Provided is an image stabilization apparatus that can reduce a decrease in the accuracy of image stabilization even when a lens that causes great perspective is used.

According to a first aspect of the present invention, there is provided an image stabilization apparatus comprising: at least one processor or circuit configured to perform the operations of the following units: an acquisition unit configured to acquire information about a lens; a motion vector detection unit configured to detect a motion vector from a plurality of images captured by an image capture unit for capturing an object image; and a calculation unit configured to calculate an image blur correction amount for correcting an image blur, on the basis of the motion vector detected by the motion vector detection unit, and a shake of an image capturing apparatus detected by a shake detection unit for detecting the shake of the image capturing apparatus, wherein the calculation unit changes weights applied to the motion vector and the shake of the image capturing apparatus for calculation of the image blur correction amount, on the basis of information related to perspective of the lens acquired by the acquisition unit.

According to a second aspect of the present invention, there is provided an image capturing apparatus comprising: an image capture device configured to capture an object image; and an image stabilization apparatus including at least one processor or circuit configured to perform the operations of the following units: an acquisition unit configured to acquire information about a lens, a motion vector detection unit configured to detect a motion vector from a plurality of images captured by the image capture unit, and a calculation unit configured to calculate an image blur correction amount for correcting an image blur, on the basis of the motion vector detected by the motion vector detection unit, and a shake of an image capturing apparatus detected by a shake detection unit for detecting the shake of the image capturing apparatus, wherein the calculation unit changes weights applied to the motion vector and the shake of the image capturing apparatus for calculation of the image blur correction amount, on the basis of information related to perspective of the lens acquired by the acquisition unit.

According to a third aspect of the present invention, there is provided a method for controlling an image stabilization apparatus, the method comprising: acquiring information about a lens; detecting a motion vector from a plurality of images captured by an image capture unit for capturing an object image; and calculating an image blur correction amount for correcting an image blur, on the basis of the motion vector detected in the motion vector detection, and a shake of an image capturing apparatus detected by a shake detection unit for detecting the shake of the image capturing apparatus, wherein the calculation includes changing weights applied to the motion vector and the shake of the image capturing apparatus for calculation of the image blur correction amount, on the basis of information related to perspective of the lens acquired in the acquisition.

According to a fourth aspect of the present invention, there is provided a computer-readable storage medium storing a program that causes a computer to execute steps of a method for controlling an image stabilization apparatus, the method comprising: acquiring information about a lens; detecting a motion vector from a plurality of images captured by an image capture unit for capturing an object image; and calculating an image blur correction amount for correcting an image blur, on the basis of the motion vector detected in the motion vector detection, and a shake of an image capturing apparatus detected by a shake detection unit for detecting the shake of the image capturing apparatus, wherein the calculation includes changing weights applied to the motion vector and the shake of the image capturing apparatus for calculation of the image blur correction amount, on the basis of information related to perspective of the lens acquired in the acquisition.

Further features of the present invention will become apparent from the following description of exemplary embodiments with reference to the attached drawings.

DESCRIPTION OF THE EMBODIMENTS

Embodiments of the present invention will now be described in detail with reference to the accompanying drawings. Firstly, features common to the embodiments will be described.

Figure 1:
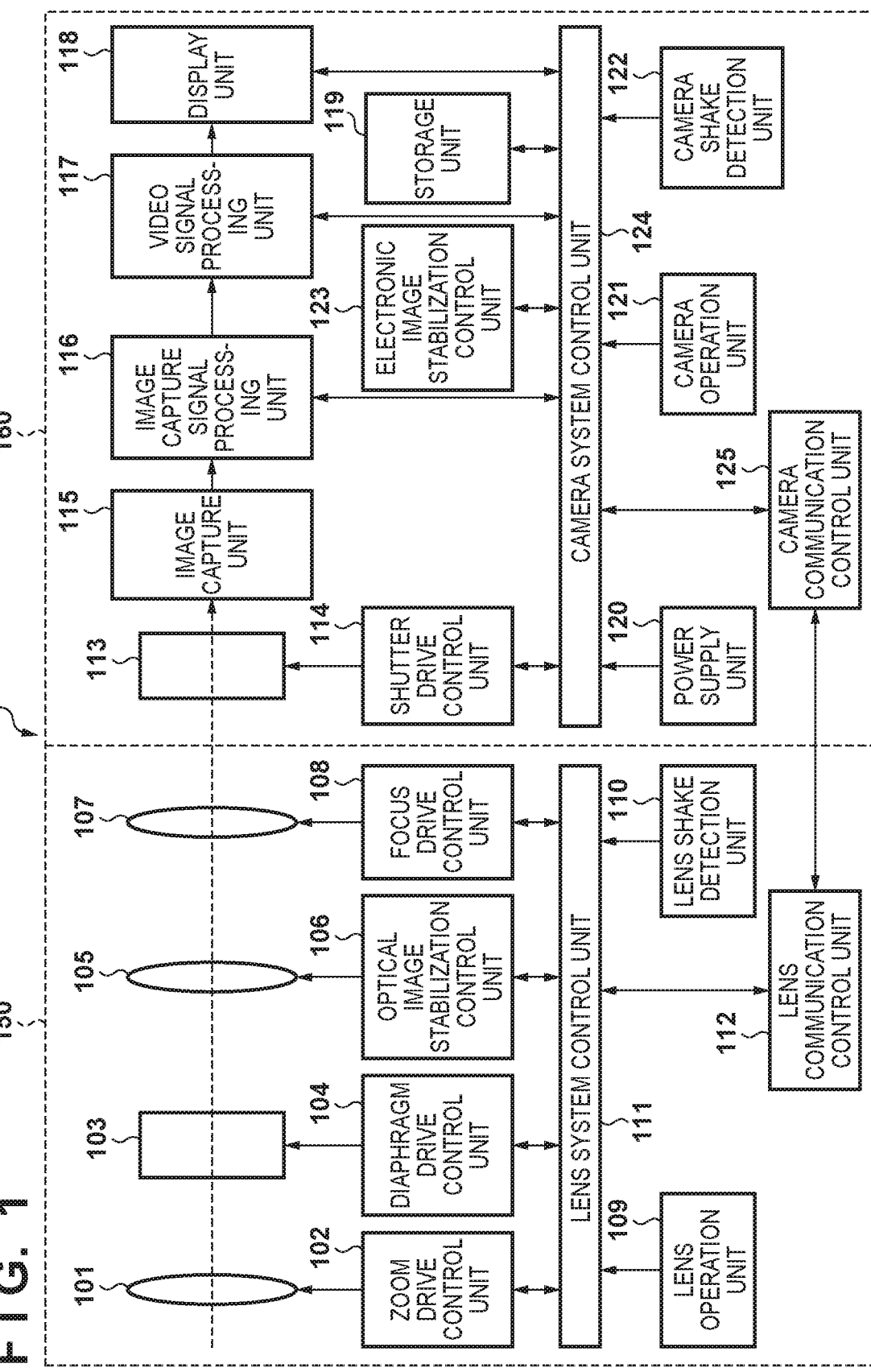
FIG. 1 is a block diagram showing a configuration of an image capturing system that is common to embodiments of the present invention.

FIG. 1 is a block diagram showing a configuration of an image capturing system 100 that is common to the embodiments of the present invention. The image capturing system 100 is an interchangeable-lens digital camera for mainly capturing a still image and a moving image. Note that the present invention is not limited to digital cameras, and is applicable to various image capturing systems. The present invention is not limited to interchangeable-lens digital cameras, and is applicable to fixed-lens digital cameras, etc.

The image capturing system 100 of FIG. 1 includes a lens apparatus 150 and a camera body 160. The lens apparatus 150 is attached, in use, to the camera body 160. The lens apparatus 150 includes a zoom unit 101 including a zoom lens, which can change the magnification. A zoom drive control unit 102 drives and controls the zoom unit 101. A diaphragm unit 103 functions as a diaphragm. A diaphragm drive control unit 104 drives and controls the diaphragm unit 103. An image stabilization unit 105 includes an image stabilization lens, such as a shift lens that moves in a direction different from the optical axis, etc. The image stabilization unit 105, which is a first image stabilization means, is driven and controlled by an optical image stabilization control unit 106. A focusing unit 107 includes a focusing lens that is focused to form an object image. A focus drive control unit 108 drives and controls the focusing unit 107.

A lens operation unit 109 is used by a user to operate the lens apparatus 150. A lens shake detection unit 110 detects the amount of a shake of the lens apparatus 150, and outputs a detection signal to a lens system control unit 111. The lens system control unit 111, which includes a central processing unit (CPU), controls the entire lens apparatus 150, i.e., performs centralized control of the drive control units and correction control units of the lens apparatus 150. The lens system control unit 111 communicates with a camera system control unit 124 of the camera body 160 through a lens communication control unit 112.

Next, the camera body 160 will be described. The camera body 160 includes a shutter unit 113. A shutter drive control unit 114 drives and controls the shutter unit 113. An image capture unit 115, which includes an image capturing device, performs photoelectric conversion on an object image formed through lenses, and outputs an electrical signal. An image capture signal processing unit 116 performs a process of converting the electrical signal output from the image capture unit 115 into a video signal. A video signal processing unit 117 processes the video signal output from the image capture signal processing unit 116. The process varies depending on what the video signal is used for. For example, the video signal processing unit 117 changes the extraction position of the video signal, depending on the correction amount of an electronic image stabilization control unit 123. The electronic image stabilization control unit 123, which is a second image stabilization means, controls image stabilization by image extraction. Note that the second image stabilization is not limited to electronic image stabilization, and may be, for example, image stabilization performed by controlling a mechanical movement of the image capturing device, or image stabilization performed by driving and controlling a movable optical element in the camera body.

A display unit 118 displays an image on the basis of a signal output from the video signal processing unit 117, if necessary. A storage unit 119 stores various data, such as video information, etc. A power supply unit 120 supplies power to the entire camera system, if necessary. A camera operation unit 121, which is used by the user to operate the camera system, outputs an operation signal to the camera system control unit 124. A camera shake detection unit 122 detects the amount of a shake of the camera, and outputs a detection signal to the camera system control unit 124. The camera system control unit 124, which includes a CPU, performs centralized control of the entire camera system. The camera system control unit 124 communicates with the lens communication control unit 112 of the lens apparatus 150 through a camera communication control unit 125. Specifically, when the lens apparatus 150 is attached to and electrically connected to the camera body 160, the lens communication control unit 112 and the camera communication control unit 125 communicate with each other.

Next, the operation of the image capturing system thus configured will be outlined. The lens operation unit 109 and the camera operation unit 121 each include an image stabilization switch that can be used to turn image stabilization on and off. When the user operates the image stabilization switch to turn image stabilization on, the lens system control unit 111 or the camera system control unit 124 instructs the optical image stabilization control unit 106 or the electronic image stabilization control unit 123 to perform an image stabilization operation. Until an instruction to turn image stabilization off is issued, the image stabilization control unit thus activated controls image stabilization.

The camera operation unit 121 includes an image stabilization mode switch that is used to select a first mode or a second mode for image stabilization. In the first mode, only optical image stabilization (first image stabilization) is performed. In the second mode, optical image stabilization and electronic image stabilization (second image stabilization) are performed in conjunction with each other for image stabilization. When the first mode is selected, the read-out position of the image capture unit 115 is fixed, and the read-out range is increased, and therefore, the angular extent of a captured image can be increased. When the second mode is selected, a more significant image blur can be addressed by changing the extraction position, depending on the image blur correction amount, although the video signal extraction range of the video signal processing unit 117 is decreased.

The camera operation unit 121 includes a shutter-release button that is configured to turn on a first switch SW1 and a second switch SW2 in this order, depending on how much the button is pressed. When the user presses the shutter-release button about halfway down, the first switch SW1 is turned on. When the user presses shutter-release button all the way down, the second switch SW2 is turned on. When the first switch SW1 is on, the focus drive control unit 108 drives the focusing unit 107 to adjust focusing, and the diaphragm drive control unit 104 drives the diaphragm unit 103 to adjust the amount of exposure to a suitable value. When the second switch SW2 is on, image data that is obtained by the image capture unit 115 performing photoelectric conversion on an object image is stored into the storage unit 119.

The camera operation unit 121 also includes a moving image record switch. The camera body 160 starts capturing a moving image after the moving image record switch is pressed down, and ends recording when the moving image record switch is pressed again by the user during recording. During capturing of a moving image, when the user operates the shutter-release button to turn the first switch SW1 and the second switch SW2 on, a process of acquiring and recording a still image is executed during recording of the moving image. The camera operation unit 121 also includes a playback mode select switch that is used to select a playback mode. When the playback mode is selected by operating the playback mode select switch, the camera stops an image stabilization operation.

First Embodiment

Figure 2:
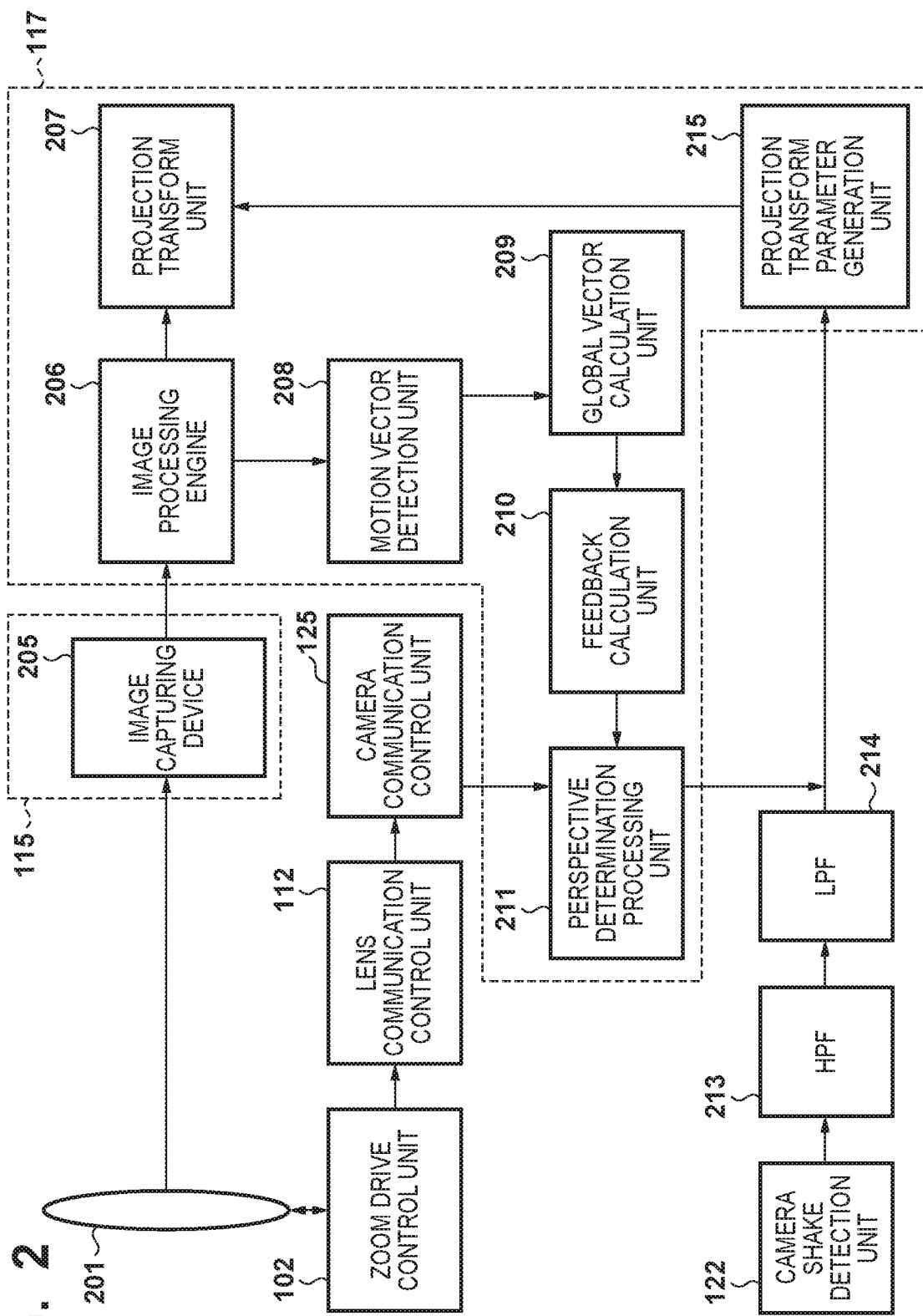
FIG. 2 is a diagram showing a configuration of a first embodiment of a portion for performing image stabilization.

A first embodiment of the present invention will now be described with reference to FIG. 2, that is directed to a process of changing a gain for image stabilization using a motion vector on the basis of information for perspective determination. As used herein, the term "perspective" means a phenomenon that an object having a shorter physical distance looks bigger, and an object having a longer physical distance looks smaller, which depends on the focal length of a lens. Note that, in FIG. 2, portions of FIG. 1 that are not involved with image stabilization are not shown. Also, the zoom unit 101, the diaphragm unit 103, the image stabilization unit 105, and the focusing unit 107 of FIG. 1 are collectively shown as an optical lens 201.

The focal length of the optical lens 201 is changed by the zoom drive control unit 102. A perspective determination value based on the changed focal length information, or the focal length information, is sent from the lens communication control unit 112 to the camera communication control unit 125. The perspective determination value or focal length information received by the camera communication control unit 125 is transferred to a perspective determination processing unit 211. Meanwhile, light passing through the optical lens 201 is imaged on the image capturing device 205, and digital image data obtained by photoelectric conversion is sent to an image processing engine 206. The digital image data sent to the image processing engine 206 is separated into a main image to be recorded, and a signal to be sent to a motion vector detection unit 208. A motion vector is detected on the basis of two temporally successive frames of digital image data (a plurality of frames of image data) sent to the motion vector detection unit 208. A global vector calculation unit 209 calculates a global vector from a plurality of detected motion vectors. The calculated global vector is converted by a feedback calculation unit 210 into a correction amount that allows for image stabilization, and the correction amount is transferred to the perspective determination processing unit 211. If the perspective determination processing unit 211 has determined that perspective is strong, the perspective determination processing unit 211 changes and decreases an image blur correction amount based on the motion vector.

Meanwhile, a camera shake detected by the camera shake detection unit 122 is converted into a shake correction amount by a high-pass filter (HPF) 213 and a low-pass filter (LPF) 214. Thereafter, the shake correction amount obtained by the conversion is added to the image blur correction amount based on the motion vector obtained through the perspective determination processing unit 211. Next, the resulting correction amount obtained by the addition is transferred to a projection transform parameter generation unit 215, which then converts the correction amount into a projection transform parameter. Finally, the main image (moving image) separated by the image processing engine 206 is subjected to projection transform that is performed by a projection transform unit using the projection transform parameter, so that an image blur is corrected.

Figure 3:
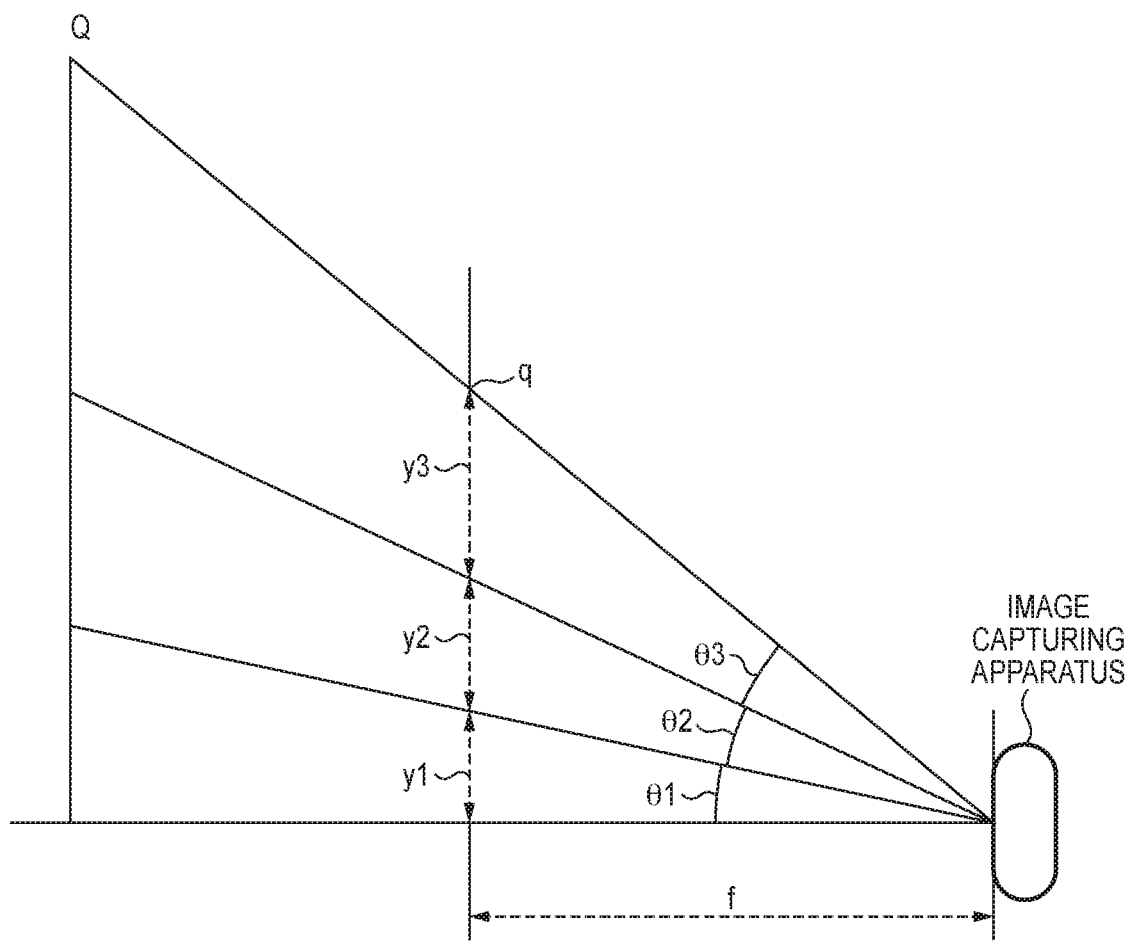
FIG. 3 is a diagram for describing a method for calculating a perspective amount.

Next, a method for calculating a perspective amount will be described with reference to FIG. 3. FIG. 3 is a diagram showing a relationship between an angle of view ($\theta1+\theta2+\theta3$) within which an image can be captured by an image capturing apparatus, an object position Q, and a position q at which an object is imaged on an image capture plane. FIG. 3 also shows angles ($\theta1$-$\theta3$) obtained by equally dividing the angle of view for perspective calculation, and the numbers of pixels (y1-y3) on the image capture plane corresponding to the respective angles. A calculation method for estimating perspective using these values will now be described. Firstly, relationships between $\theta1$, $\theta2$, and $\theta3$ obtained by equally dividing an angle of view within which an image can be captured, and the respective corresponding numbers of pixels y1, y2, and y3 on an image capturing device are represented by:

$$y1 = f \times \tan(\theta1) \quad (1)$$

$$y2 = f \times \tan(\theta2) \quad (2)$$

$$y3 = f \times \tan(\theta3) \quad (3)$$

Next, shown are expressions for using these values to calculate ratios P(1-2), P(1-3), and P(2-3) of image heights of perspective amounts, and relationships PD(1-2), PD(1-3), and PD(2-3) which are accurate pixel difference amounts between image heights due to perspective:

$$P(1\text{-}2)=y1/y2 \quad (4)$$

$$P(1\text{-}3)=y1/y3 \quad (5)$$

$$P(2\text{-}3)=y2/y3 \quad (6)$$

$$PD(1\text{-}2)=|y1-y2| \quad (7)$$

$$PD(1\text{-}3)=|y1-y3| \quad (8)$$

$$PD(2\text{-}3)=|y2-y3| \quad (9)$$

As the value of P(1-2), P(1-3), or P(2-3) is further away from one, it is determined that the perspective amount between image heights is greater. The accurate pixel difference amounts between image heights can be calculated as PD(1-2), PD(1-3), and PD(2-3), and their influences can be determined. Specifically, the influence of a perspective amount is calculated in advance, and is then taken into consideration when image stabilization control or vector weighting is performed.

Figure 4:
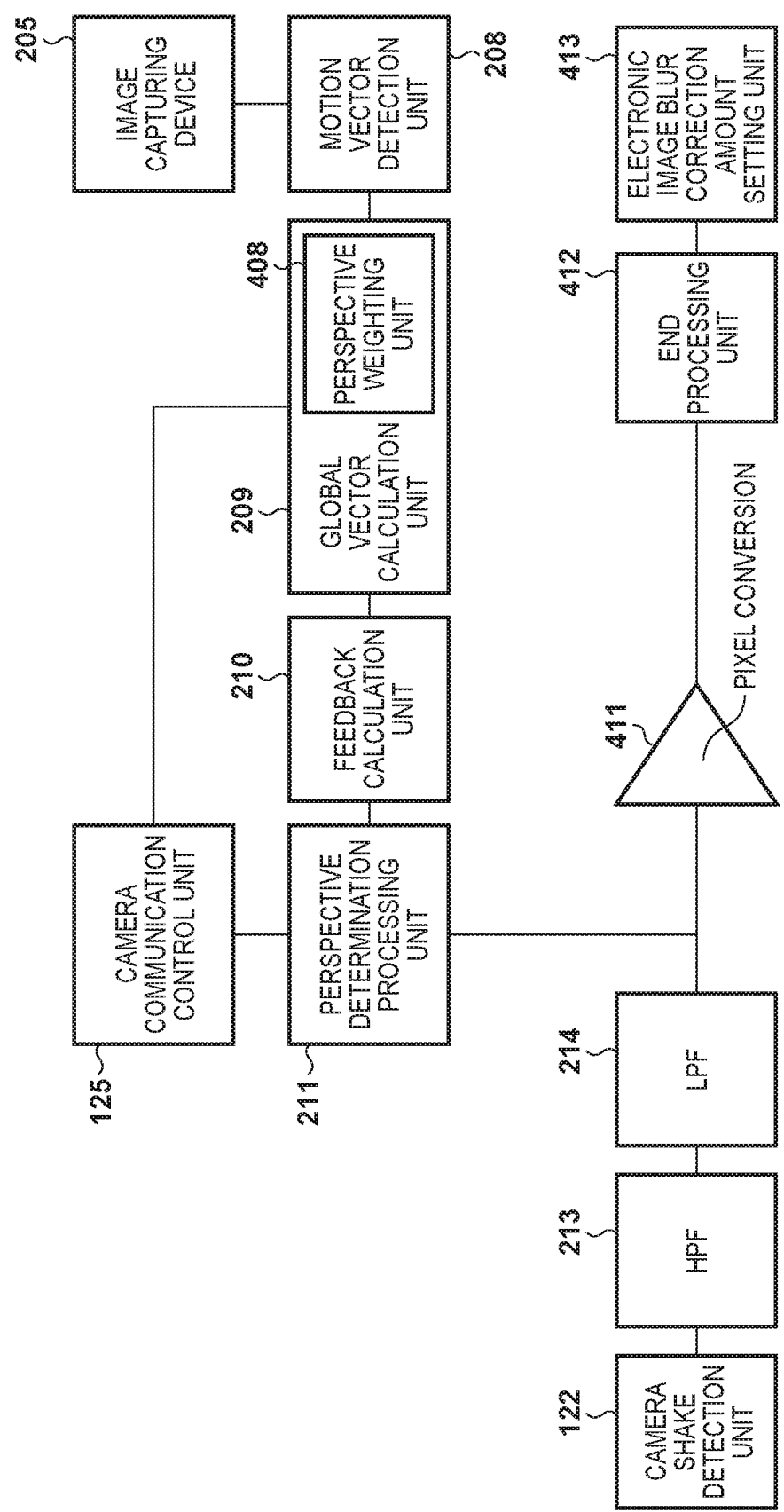
FIG. 4 is a block diagram showing a configuration of a signal process portion according to the first embodiment.

Next, a signal process in this embodiment will be described with reference to FIG. 4. The flow of the signal process includes a signal process of detecting a camera shake signal from a signal of the camera shake detection unit 122 of the camera body 160, and a process of detecting a motion vector from an image captured by the image capturing device 205, using the motion vector detection unit 208. Furthermore, provided is the camera communication control unit 125, which receives perspective information from the lens apparatus 150. Camera shake information acquired from the camera shake detection unit 122, which includes a gyroscopic sensor, an acceleration sensor, etc., is integrated after low-frequency and high-frequency components are removed therefrom by the HPF 213 and the LPF 214, respectively. Thereafter, only a camera shake frequency band to be corrected is converted into an image blur correction amount.

Meanwhile, from successive frames of digital image data captured by the image capturing device 205, the motion vector detection unit 208 detects a motion vector (local motion vector) in each of a plurality of divided area of an image. A plurality of detected motion vectors (local motion vectors) and the perspective information acquired from the lens apparatus 150 are used by a perspective weighting unit 408 included in the global vector calculation unit 209, to apply weights depending on a perspective amount to the motion vectors. A histogram is generated using the weighted motion vectors. From the generated motion vector histogram, the global vector calculation unit 209 detects a peak, and calculates a global vector in an image. Next, the global vector is subjected to a filtering process by the feedback calculation unit 210, and is added to the above image blur correction amount that is calculated on the basis of the signal of the camera shake detection unit 122. The resulting image blur correction amount is converted into a pixel value by a pixel conversion unit 411, and an end contact process is executed by an end processing unit 412. Finally, the image blur correction amount is set in an electronic image blur correction amount setting unit 413, and image stabilization is executed.

Figure 5:
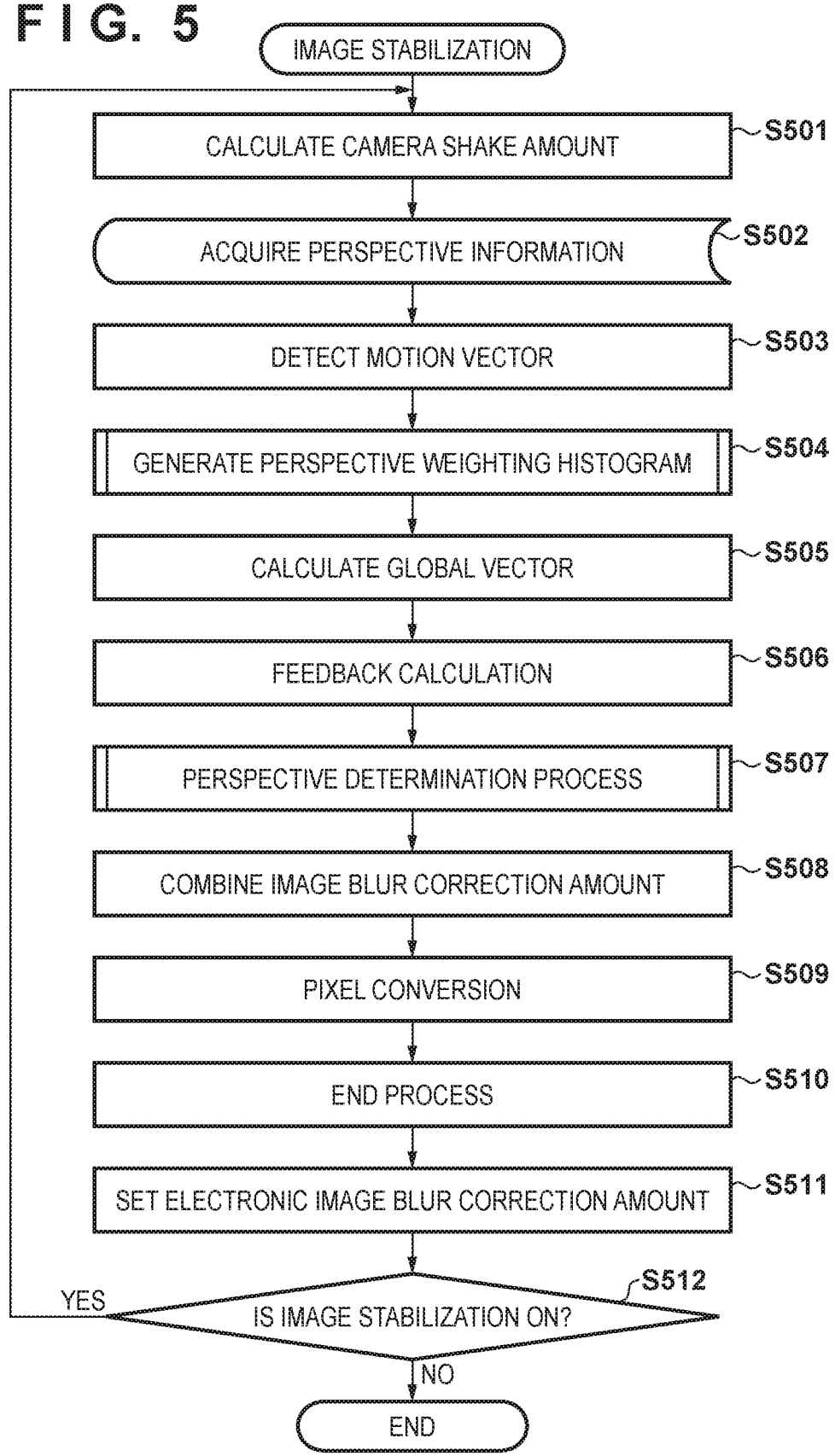
FIG. 5 is a flowchart showing an operation in an image stabilization process according to the first embodiment.

FIG. 5 is a flowchart showing an operation in an image stabilization process according to this embodiment. During the start of the image stabilization process, a shake amount detected by the camera shake detection unit 122 is subjected to filtering to calculate a camera shake amount in step S501. Next, in step S502, information related to perspective for the lens apparatus 150 is acquired. Next, in step S503, the motion vector detection unit 208 detects a plurality of motion vectors from successive images captured by the image capturing device 205. Next, in step S504, the perspective weighting unit 408 applies weights to the motion vectors according to the perspective information, and generates a motion vector histogram in which the axes represent the magnitude of a motion vector and the number of detected motion vectors.

Next, in step S505, the global vector calculation unit 209 searches for a peak in the motion vector histogram generated in step S504, and sets a found peak as a global vector in an image. Next, in step S506, the feedback calculation unit 210 performs filtering on the calculated global vector, and calculates a motion vector-based image blur correction amount. Next, in step S507, the perspective determination processing unit 211 multiplies the motion vector-based image blur correction amount by a gain depending on a perspective amount. Next, in step S508, the camera shake amount calculated from the signal of the camera shake detection unit 122 is combined with the image blur correction amount calculated from the motion vectors. Next, in step S509, the pixel conversion unit 411 converts the combined image blur correction amount into a pixel value for the image capturing device 205. Next, in step S510, the end processing unit crops the image blur correction amount after the pixel conversion into an upper limit value under which correction is allowed. Finally, in step S511, the electronic image blur correction amount setting unit 413 sets the cropped image blur correction amount for an electronic image stabilization process, and electronic image stabilization is executed. Thereafter, if, in step S512, it has been determined that image stabilization is on, the operation of this flow is repeated, and image stabilization is continuously executed for a moving image.

Figure 6:
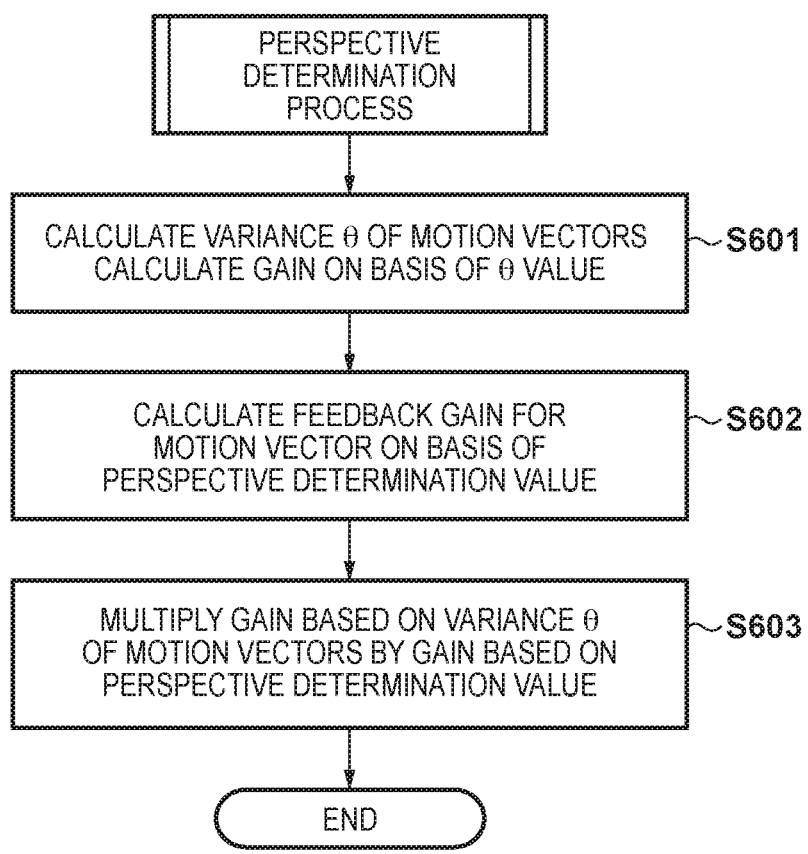
FIG. 6 is a flowchart showing an operation of a perspective determination process.

Next, FIG. 6 is a flowchart showing an operation of a perspective determination process in step S507 of FIG. 5. In the perspective determination process, initially, in step S601, a variance value θ(vec) of the detected motion vectors is calculated using expressions (10) and (11).

$$Vec(\text{Average}) = \frac{1}{n}\sum_{i=1}^{n} Vec(i) \quad (10)$$

$$\theta(vec) = \frac{1}{n}\sum_{i=1}^{n} (Vec(i) - Vec(\text{Average}))^2 \quad (11)$$

Next, a gain for motion vector-based image stabilization is calculated on the basis of the variance value θ(vec) of the motion vectors. Next, in step S602, the feedback calculation unit 210 calculates a gain for a motion vector-based image blur correction amount, on the basis of the value of a perspective amount estimated from information acquired from the lens apparatus 150. Finally, in step S603, the gain calculated from the variance value θ(vec) of the motion vectors is multiplied by a gain corresponding to the perspective determination value to determine a final gain for the motion vector-based image blur correction amount.

Figure 7A:
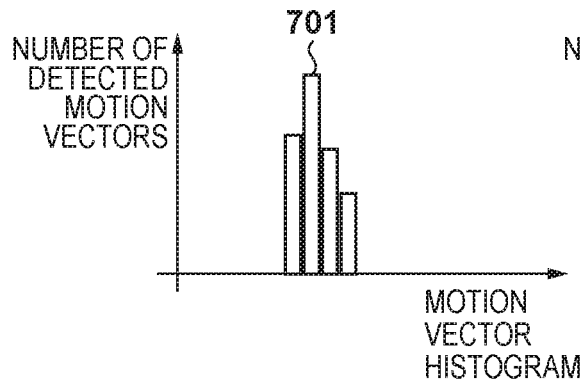
FIGS. 7A-7F are diagrams showing a variance of motion vectors and a perspective determination value.
Figure 7B:
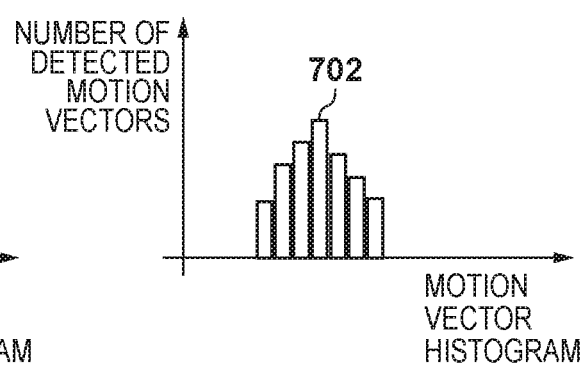

FIGS. 7A-7F are diagrams for describing the method for calculating a gain for a perspective-based image blur correction amount on the basis of perspective, and the method for calculating a gain for an image blur correction amount on the basis of the variance value of motion vectors, which are described above with reference to FIG. 6. Typically, when the lens has a small range of change in perspective amount, the motion vector histogram in which the axes represent the magnitude of a motion vector and the number of detected motion vectors, has a small variance, and has a significant peak bin 701, as shown in FIG. 7A. In contrast to this, when the lens has a large range of change in perspective amount, the variance width of motion vectors is greater, and a peak bin 702 is closer to other vector bins, as shown in FIG. 7B.

Figure 7C:
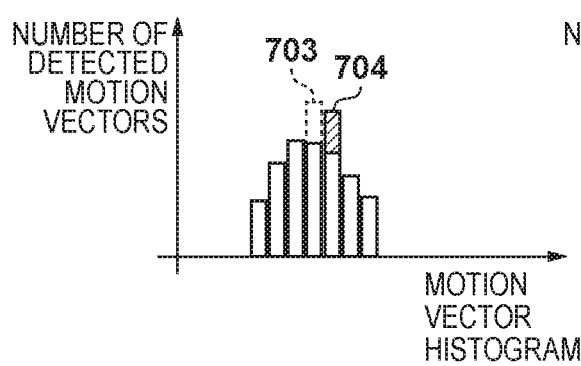

In this situation, if the camera is shaken, a phenomenon occurs in which an area that has a perspective amount different from that of an area in which an object is present is shifted, and therefore, a correct peak bin 703 indicated by a dotted line is shifted to a hatched bin 704, as shown in FIG. 7C. This phenomenon is particularly significant on an ultra-wide side that has a great perspective amount, which affects the stability of image stabilization. Specifically, this phenomenon significantly adversely affects performance of motion vector-based image stabilization, such as feeding back of motion vectors to optical image stabilization, identification of an offset amount of the camera shake detection unit 122, etc.

Figure 7D:
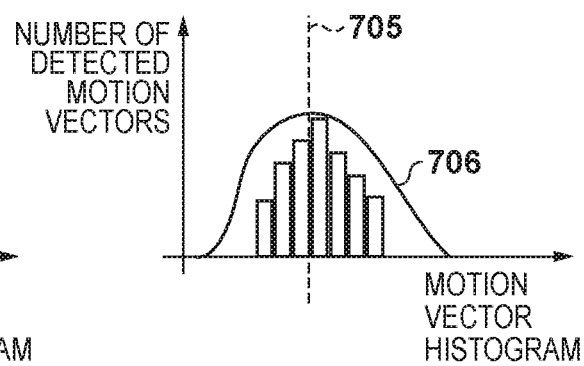
Figure 7E:
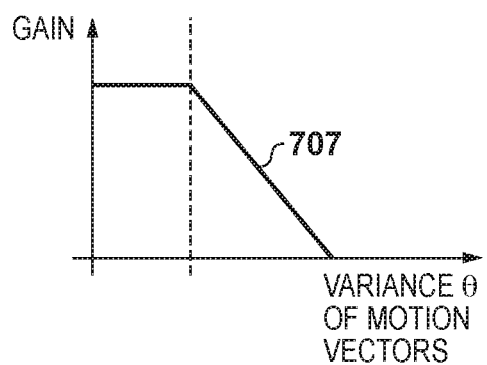
Figure 7F:
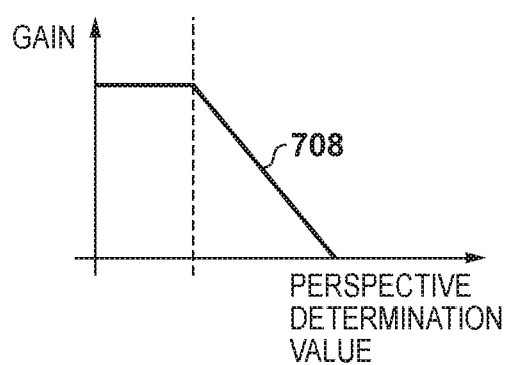

With the above in mind, in this embodiment, as shown in FIG. 7D, an average value 705 of motion vectors, and a variance value $\theta$ 706 from an average value thereof, are calculated. A gain for a motion vector-based correction amount is calculated on the basis of the variance value $\theta$, as shown in FIG. 7E, whereby the influence of perspective is controlled. In addition, a gain for the motion vector-based correction amount is calculated on the basis of a perspective determination value calculated from a value acquired from the lens apparatus 150 as shown in FIG. 7F, whereby the influence of perspective is controlled. By multiplying these two gains, the adverse influence of perspective is separated with high accuracy, and the stability of image stabilization performance is thereby improved. In addition, the adverse influence on the offset identification of the camera shake detection unit 122 is eliminated.

According to this embodiment, even when a lens that causes a great perspective amount is attached, a gain for motion vector-based image stabilization is changed, depending on a perspective amount. Specifically, when a perspective amount is great, a gain for motion vector-based image stabilization is reduced. As a result, even when a lens that causes a great perspective amount is attached, stable image stabilization can be performed.

Second Embodiment

Figure 8:
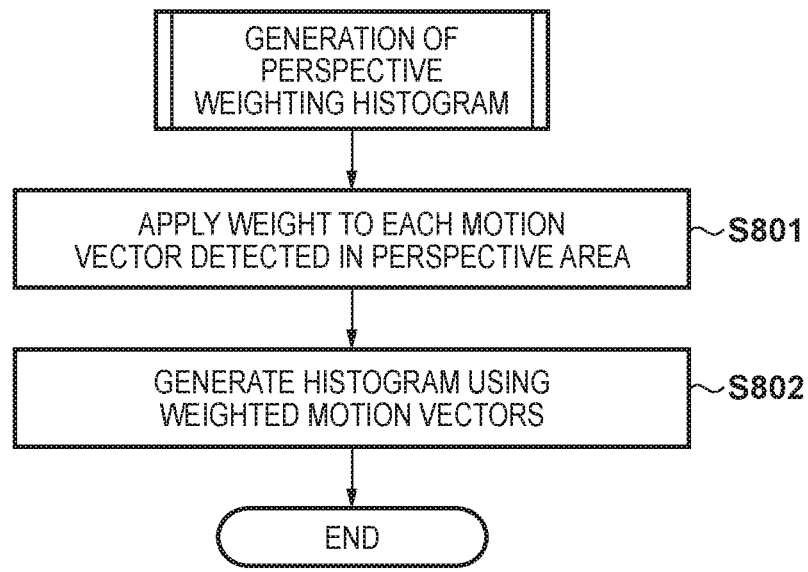
FIG. 8 is a diagram showing an operation of generating a weighting histogram according to a second embodiment.

A perspective weighting process according to a second embodiment of the present invention will now be described. The second embodiment is different from the first embodiment in the operation of generating a perspective weighting histogram in step S504 of FIG. 5. FIG. 8 is a diagram showing an operation of generating a perspective weighting histogram according to the second embodiment.

Initially, in step S801, weighting is performed in each motion vector detection area. A weight varies depending on a difference in the magnitude of a perspective amount calculated from a value acquired from the lens apparatus 150. Thereafter, in step S802, a motion vector histogram in which the axes represent the magnitude of a motion vector and the number of detected motion vectors, is generated using weighted motion vectors. The influence of a motion vector in an area having a great change in perspective amount can be reduced.

Figure 9:
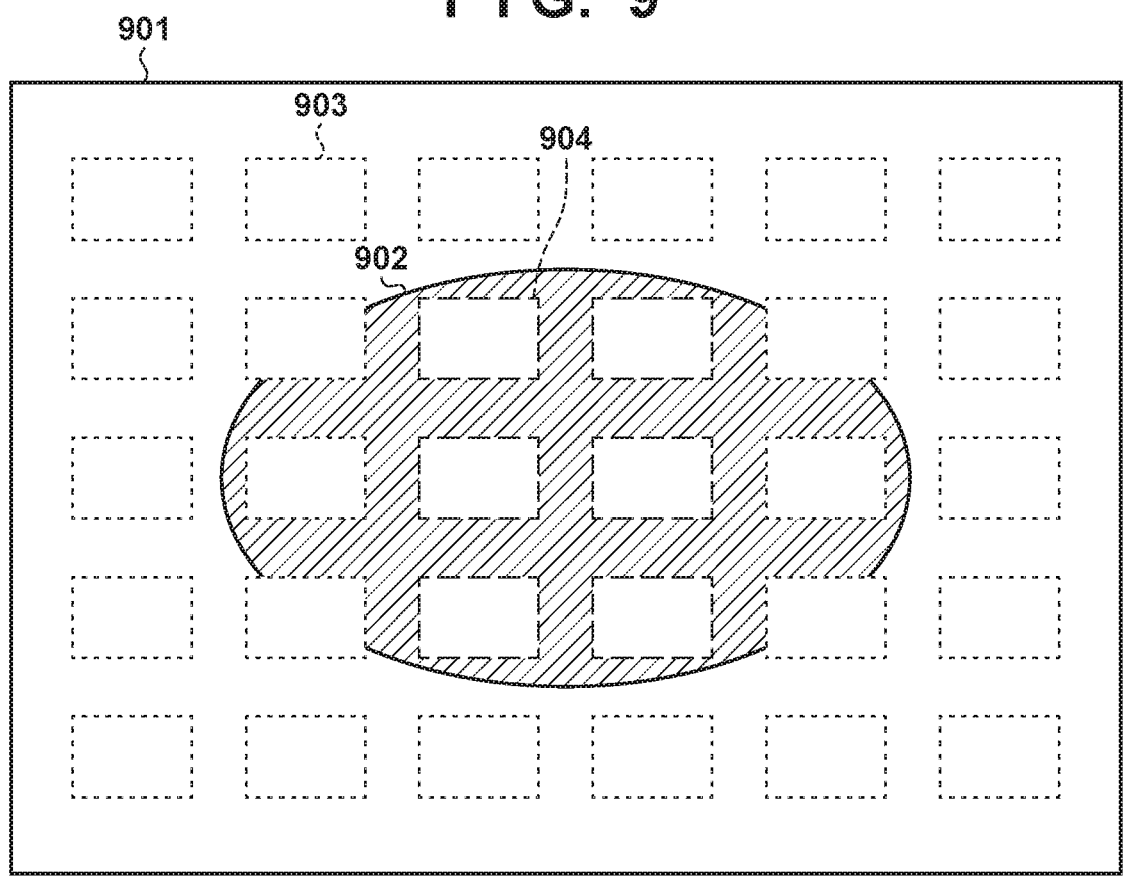
FIG. 9 is a diagram showing a relationship between an image capturing device plane, a motion vector area, and a perspective amount.

Next, FIG. 9 is a diagram for describing the relative order of the magnitudes of perspective amounts, the arrangement of motion vectors, and weights applied to the motion vectors. In an area where light passing through the optical system of the lens apparatus 150 is imaged on the image capturing device 205, as one proceeds from the optical center to the periphery, a variation in perspective amount particularly increases. An area 901 where there are greater variations in perspective amount is surrounded by a solid line, and an area 902 where there are smaller variations in perspective amount is represented by a hatched ellipse. Motion vectors detected in motion vector detection frames 903 provided in the area having greater variations in perspective amount are unstable for a motion due to the great variation in perspective amount. In contrast to this, motion vectors detected in motion vector detection frames 904 provided in the area having small variations in perspective amount are stable for a motion.

Figure 10A:
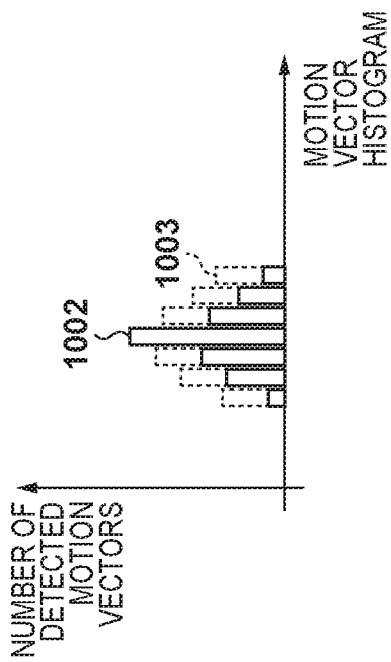
FIGS. 10A and 10B are diagrams for describing a method for eliminating an influence of perspective by weighting.
Figure 10B:
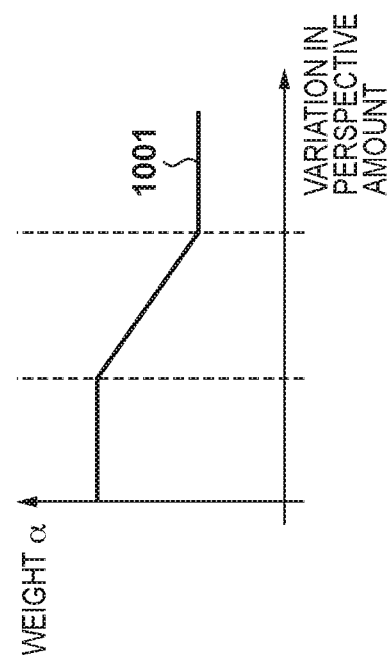

Here, FIGS. 10A and 10B are diagrams for describing weighting depending on a variation in perspective amount and its result. In FIG. 10A, weights depending on a variation in perspective amount are applied to motion vectors. FIG. 10A shows an input/output function form where the horizontal axis represents a variation in perspective amount, and the vertical axis represents a weight $\alpha$. The weight $\alpha$ takes a continuous value from one (maximum) to zero, and varies between zero and one, depending on a variation in perspective amount. By reflecting such weighting on the number of detected motion vectors in a motion vector histogram, as shown in FIG. 10B, while a peak bin 1002 remains unchanged, other bins are reduced, i.e., bin portions 1003 indicated by a dotted line are removed from bins in an area having greater variations in perspective amount. As a result, the influence of unstable motion vectors in an area having greater variations in perspective amount can be reduced.

The above feature of this embodiment is effective not only in improving the stability of motion vector-based image stabilization, but also in feeding back of a motion vector in FIG. 11, and identification of an offset of a shake detector in FIG. 12, which will now be described.

Figure 11:
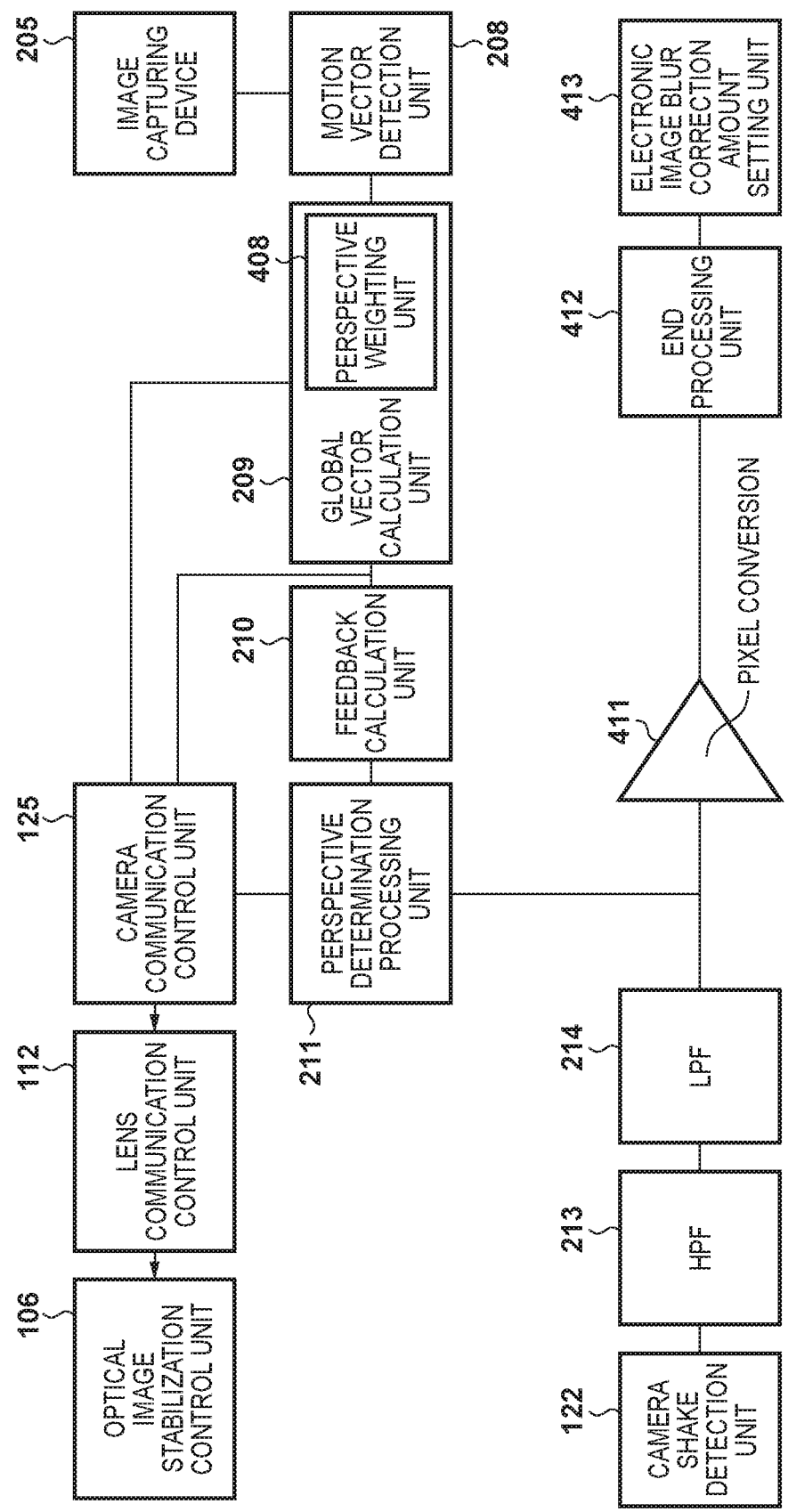
FIG. 11 is a block diagram showing a configuration of a signal process portion according to the second embodiment.

Firstly, a signal process flow shown in FIG. 11 includes a signal process of detecting a camera shake signal from a signal of the camera shake detection unit 122 of the camera body 160, and a process of detecting a motion vector from an image captured by the image capturing device 205, using the motion vector detection unit 208. Furthermore, provided is the camera communication control unit 125, which receives perspective information from the lens apparatus 150. In addition, provided is the optical image stabilization control unit 106, which corrects an image blur by optically operating a shift lens. Also, provided is a motion vector feedback for correcting a low-frequency shake, which a gyroscopic sensor, etc., has difficulty in detecting, by feeding back a motion vector detected by a camera through the lens communication control unit 112. Camera shake information acquired from the camera shake detection unit 122, which includes a gyroscopic sensor, an acceleration sensor, etc., is integrated after low-frequency and high-frequency components are removed therefrom by the HPF 213 and the LPF 214, respectively. Thereafter, only a camera shake frequency band to be corrected is converted into an image blur correction amount.

Meanwhile, from successive frames of digital image data captured by the image capturing device 205, the motion vector detection unit 208 detects a plurality of motion vectors. The detected motion vectors and the perspective information acquired from the lens apparatus 150 are used by the perspective weighting unit 408 included in the global vector calculation unit 209, to apply weights depending on a perspective amount to the motion vectors. A histogram is generated using the weighted motion vectors. From the generated motion vector histogram, the global vector calculation unit 209 detects a peak, and calculates a global vector in an image. The global vector is transferred from the camera body 160 to the optical image stabilization control unit 106 in the lens apparatus 150, whereby the image stabilization effect of a motion vector, which is particularly effective in a low-frequency area, can be applied to optical image stabilization. Next, the global vector is subjected to a filtering process by the feedback calculation unit 210, and is added to the above image blur correction amount that is calculated based on a signal of the camera shake detection unit 122. The resulting image blur correction amount is converted into a pixel value by the pixel conversion unit 411, and an end contact process is executed by the end processing unit 412. Finally, the image blur correction amount is set in the electronic image blur correction amount setting unit 413, and image stabilization is executed. In this technique, the perspective weighting process is also effective and contributes to an improvement in the stability of optical image stabilization.

Figure 12:
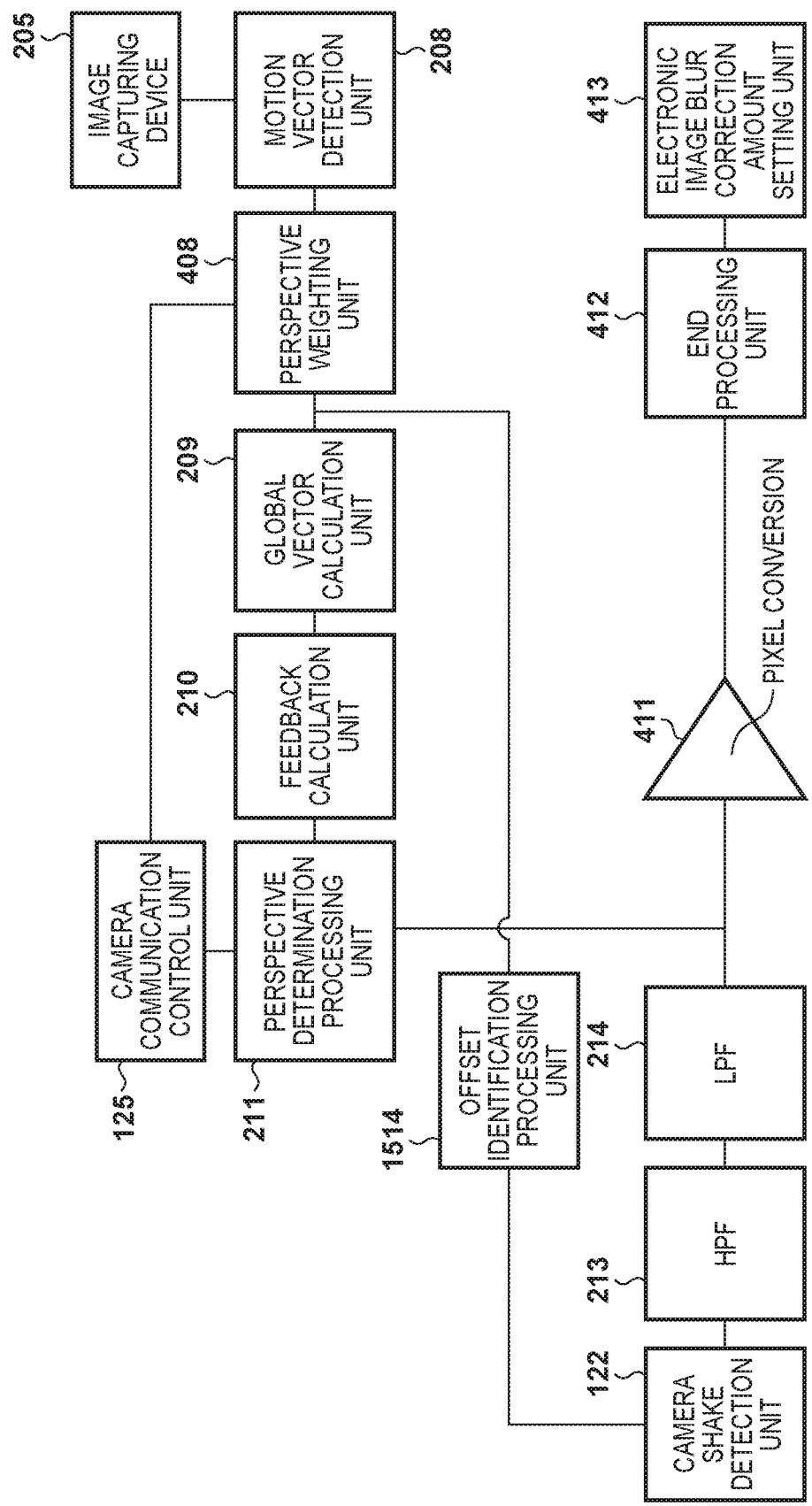
FIG. 12 is a block diagram showing a configuration of a signal process portion according to the second embodiment.

Next, a signal process flow shown in FIG. 12 includes a signal process of detecting a camera shake signal from a signal of the camera shake detection unit 122 of the camera body 160, and a process of detecting a motion vector from an image captured by the image capturing device 205, using the motion vector detection unit 208. Furthermore, provided is the camera communication control unit 125, which receives perspective information from the lens apparatus 150. In addition, provided is an offset identification processing unit 1514 that compares global motion vectors in time sequence to estimate an offset contained in the output of the camera shake detection unit 122, and remove the offset of the camera shake detection unit 122.

Meanwhile, from successive frames of digital image data captured by the image capturing device 205, the motion vector detection unit 208 detects a plurality of motion vectors. The detected motion vectors and the perspective information acquired from the lens apparatus 150 are used by the perspective weighting unit 408 to apply weights depending on a perspective amount to the motion vectors. A histogram is generated using the weighted motion vectors. From the generated motion vector histogram, the global vector calculation unit 209 detects a peak, and calculates a global vector in an image. Camera shake information acquired from the camera shake detection unit 122, such as a gyroscopic sensor, etc., is compared with global vectors in images in time sequence, whereby an offset for the gyroscopic sensor is removed. Next, the camera shake information from which the offset has been removed is integrated after low-frequency and high-frequency components are removed therefrom by the HPF 213 and the LPF 214, respectively. Thereafter, only a camera shake frequency band to be corrected is converted into an image blur correction amount. Next, the global vector is subjected to a filtering process by the feedback calculation unit 210, and is added to the above calculated image blur correction amount. The resulting image blur correction amount is converted into a pixel value by the pixel conversion unit 411, and an end contact process is executed by the end processing unit 412. Finally, the image blur correction amount is set in the electronic image blur correction amount setting unit 413, and image stabilization is executed.

In this technique, the perspective weighting process is also effective and contributes to an improvement in the stability of optical image stabilization.

According to this embodiment, even when a lens that causes a great perspective amount is attached, weights depending on a perspective amount are applied to motion vectors. Specifically, when a perspective amount is great, a weight applied to a motion vector is reduced. As a result, the influence of a motion vector detected in an area having a great perspective amount can be reduced, and therefore, stable image stabilization performance can be achieved.

Third Embodiment

Figure 13:
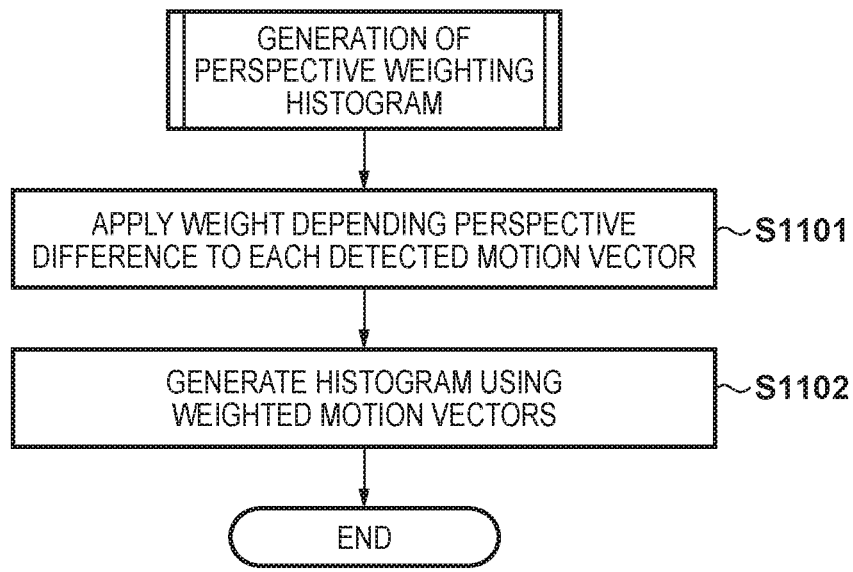
FIG. 13 is a flowchart showing an operation of generating a weighting histogram.

A perspective weighting process according to a third embodiment of the present invention will be described. The third embodiment is different from the first embodiment in the operation of generating a perspective weighting histogram in step S504 of FIG. 5. FIG. 13 is a diagram showing an operation of generating a perspective weighting histogram according to the third embodiment.

Initially, a weight is applied to a motion vector detected in each motion vector detection frame if there is a great difference in a variation in perspective amount acquired from a lens between before and after movement. The weight varies depending the direction and position of the detected motion vector. The weighted motion vectors are used to generate a motion vector histogram in which the axes represent the magnitude of a motion vector and the number of detected motion vectors. This process allows for reduction of the influence of unstable motion vectors output from areas where a variation in perspective amount is significant in a motion vector detection frame.

Figure 14:
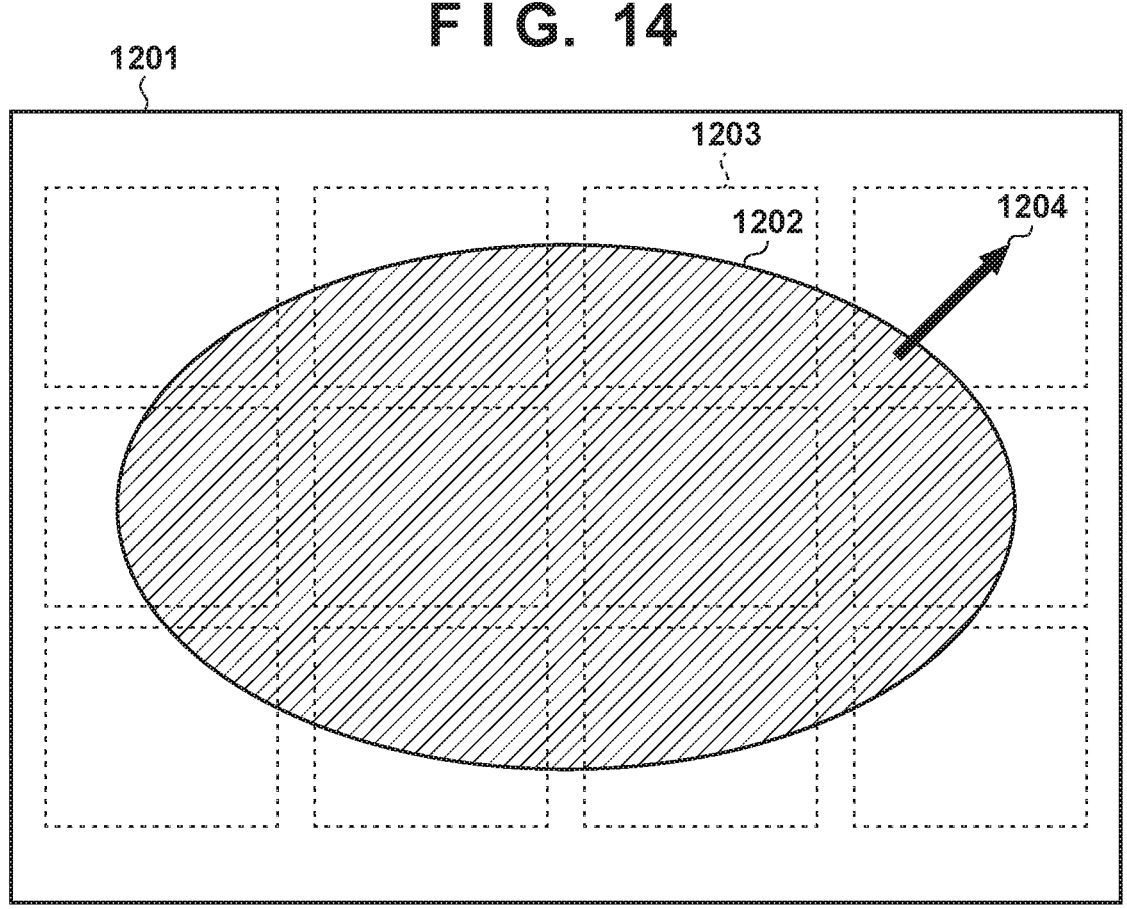
FIG. 14 is a diagram showing a relationship between an image capturing device plane and a perspective amount.

Next, the relative order of the magnitudes of variations in perspective amount in a motion vector detection frame, the arrangement of motion vectors, and weights applied to the motion vectors, will be described with reference to FIG. 14. In an area where light passing through the optical system of the lens apparatus 150 is imaged on the image capturing device 205, as one proceeds from the optical center to the periphery, a variation in perspective amount particularly increases. An area 1201 where there are greater variations in perspective amount is surrounded by a solid line, and an area 1202 where there are smaller variations in perspective amount is represented by a hatched ellipse. Of motion vectors detected in motion vector detection frames 1203 provided in the area having greater variations in perspective amount, a motion vector having a direction in which the difference in perspective amount between before and after movement is great is unstable.

Figure 15A:
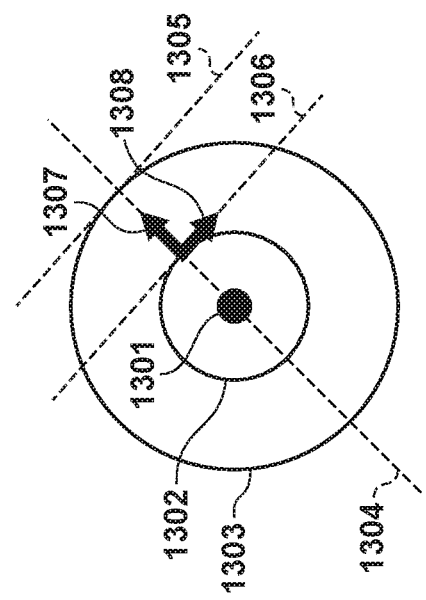
FIGS. 15A-15C are diagrams showing a relationship between a motion vector detection direction and a perspective amount.
Figure 15C:
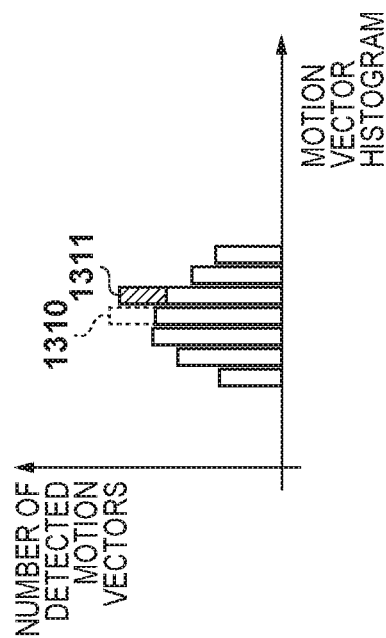
Figure 15B:
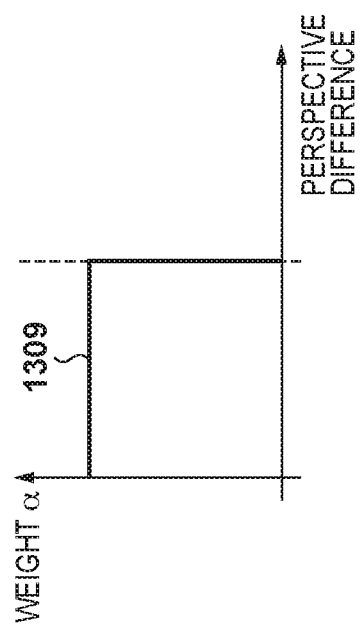

With this in mind, weighting depending on a variation in perspective amount in a detection frame and its result will be described with reference to FIGS. 15A-15C.

A perspective weighting direction will be described with reference to FIG. 15A. Firstly, a perspective amount increases from a circle 1302 to a circle 1303. The circles 1301 and 1302 are concentric circles whose center is an optical axis 1301. Therefore, there is a greater perspective variation for a motion vector 1307 detected in the direction of a line 1304 extending radially from the optical axis. In contrast to this, there is a smaller perspective variation for a motion vector 1308 detected in a tangential direction 1306 of the concentric circle. The perspective variation can be calculated as the length and position (image capture distance) of a projection of a detected motion vector on a line extending radially from the center, i.e., the optical axis. The perspective variation thus calculated can be used as an input in FIG. 15B. In FIG. 15B, a weight is applied to each motion vector. The weight varies depending on a variation in perspective amount in areas before and after movement in a detection frame. FIG. 15B shows an input/output function form where the horizontal axis represents a variation in perspective amount between before and after movement in a detection frame, and the vertical axis represents a weight $\alpha$. The weight $\alpha$ takes a continuous value from one (maximum) to zero, and varies between zero and one, depending on a variation in perspective amount. The weight $\alpha$ is set to zero for a motion vector for which there is a great variation in perspective amount between before and after movement in a detection frame. As a result, as shown in FIG. 15C, a bin portion 1310 detected in an area where there is a great variation in perspective amount between before and after movement in a detection frame, which is indicated by a dotted line, is removed from a peak bin. As a result, the peak bin portion can be prevented from being shifted to a bin portion 1311 (indicated by hatching) in an adjacent bin. Therefore, the influence of an unstable motion vector can be reduced.

According to this embodiment, even when a lens that causes a great perspective amount is attached, weights depending on a variation in perspective amount are applied to motion vectors. As a result, the influence of a motion vector calculated from a representative point (feature point) detected in an area having a different perspective amount can be eliminated. Therefore, stable image stabilization performance can be achieved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-008787, filed Jan. 20, 2017, which is hereby incorporated by reference herein in its entirety.

What is claimed is:

1. An image stabilization apparatus comprising:
at least one processor or circuit configured to perform the operations of the following units:
an acquisition unit configured to acquire information about a lens;
a motion vector detection unit configured to detect a motion vector from a plurality of images captured by an image capture unit for capturing an object image; and
a calculation unit configured to calculate an image blur correction amount for correcting an image blur, on the basis of the motion vector detected by the motion vector detection unit, and a shake of an image capturing apparatus detected by a shake detection unit for detecting the shake of the image capturing apparatus,
wherein the calculation unit changes weights applied to the motion vector and the shake of the image capturing apparatus for calculation of the image blur correction amount, on the basis of information related to perspective of the lens acquired by the acquisition unit, and
wherein the information related to the perspective of the lens includes a perspective determination value calculated from a ratio of a first image capture distance and a second image capture distance, or a difference in number of pixels between the first and second image capture distances, the first and second image capture distances being obtained by projecting a first angle and a second angle onto an image capture plane, the first and second angles being obtained by equally dividing an angle of view calculated from a focal length of the lens and a size of the image capture plane, the first angle being closer to an optical axis of the lens than is the second angle.

2. The image stabilization apparatus according to claim 1, wherein
when change in the perspective of the lens is larger than a predetermined value, the calculation unit reduces the weight applied to the motion vector to calculate the image blur correction amount.

3. The image stabilization apparatus according to claim 1, wherein the at least one processor or circuit configured to further perform the operations of the following unit:
an image stabilization unit configured to correct an image blur on the basis of the image blur correction amount calculated by the calculation unit.

4. An image stabilization apparatus comprising:
at least one processor or circuit configured to perform the operations of the following units:
an acquisition unit configured to acquire information about a lens;
a motion vector detection unit configured to detect a motion vector from a plurality of images captured by an image capture unit for capturing an object image; and
a calculation unit configured to calculate an image blur correction amount for correcting an image blur, on the basis of the motion vector detected by the motion vector detection unit, and a shake of an image capturing apparatus detected by a shake detection unit for detecting the shake of the image capturing apparatus,
wherein the calculation unit changes weights applied to the motion vector and the shake of the image capturing apparatus for calculation of the image blur correction amount, on the basis of information related to perspective of the lens acquired by the acquisition unit, wherein the motion vector detection unit divides an image captured by the image capture unit into a plurality of areas, and calculates a single global vector as the motion vector, using local motion vectors obtained in the respective divided areas, and wherein the calculation unit applies a weight depending on a size of a projection of a local motion vector on a line radially extending from an optical axis as a center, to the local motion vector.

5. The image stabilization apparatus according to claim 4, wherein
the motion vector detection unit applies a weight depending on the perspective of the lens to each of the local motion vectors obtained in the respective divided areas, to calculate the global vector.

6. The image stabilization apparatus according to claim 5, wherein
the motion vector detection unit applies a weight depending on the perspective of the lens to each of the local motion vectors obtained in the respective divided areas, and thereafter, generates a histogram of the local motion vectors obtained in the respective divided areas, and calculates the global vector on the basis of the histogram.

7. The image stabilization apparatus according to claim 6, wherein
the calculation unit changes the weights applied to the motion vectors, depending on variance values of the motion vectors in the histogram.

8. The image stabilization apparatus according to claim 4, wherein
in the calculation of the global vector by the motion vector detection unit, the weights applied to the local motion vectors obtained in the divided areas in a periphery of the image are smaller than the weights applied to the local motion vectors obtained in the divided areas near a center of the image.

9. An image capturing apparatus comprising:
an image capture device configured to capture an object image; and
an image stabilization apparatus including at least one processor or circuit configured to perform the operations of the following units: an acquisition unit configured to acquire information about a lens, a motion vector detection unit configured to detect a motion vector from a plurality of images captured by the image capture unit, and a calculation unit configured to calculate an image blur correction amount for correcting an image blur, on the basis of the motion vector detected by the motion vector detection unit, and a shake of an image capturing apparatus detected by a shake detection unit for detecting the shake of the image capturing apparatus, wherein the calculation unit changes weights applied to the motion vector and the shake of the image capturing apparatus for calculation of the image blur correction amount, on the basis of information related to perspective of the lens acquired by the acquisition unit, and
wherein the information related to the perspective of the lens includes a perspective determination value calculated from a ratio of a first image capture distance and a second image capture distance, or a difference in number of pixels between the first and second image capture distances, the first and second image capture distances being obtained by projecting a first angle and a second angle onto an image capture plane, the first and second angles being obtained by equally dividing an angle of view calculated from a focal length of the lens and a size of the image capture plane, the first angle being closer to an optical axis of the lens than is the second angle.

10. A method for controlling an image stabilization apparatus, the method comprising:
acquiring information about a lens;
detecting a motion vector from a plurality of images captured by an image capture unit for capturing an object image; and
calculating an image blur correction amount for correcting an image blur, on the basis of the motion vector detected in the motion vector detection, and a shake of an image capturing apparatus detected by a shake detection unit for detecting the shake of the image capturing apparatus,
wherein the calculation includes changing weights applied to the motion vector and the shake of the image capturing apparatus for calculation of the image blur correction amount, on the basis of information related to perspective of the lens acquired in the acquisition, and
wherein the information related to the perspective of the lens includes a perspective determination value calculated from a ratio of a first image capture distance and a second image capture distance, or a difference in number of pixels between the first and second image capture distances, the first and second image capture distances being obtained by projecting a first angle and a second angle onto an image capture plane, the first and second angles being obtained by equally dividing an angle of view calculated from a focal length of the lens and a size of the image capture plane, the first angle being closer to an optical axis of the lens than is the second angle.

11. An image capturing apparatus comprising:
an image capture device configured to capture an object image; and
an image stabilization apparatus including at least one processor or circuit configured to perform the operations of the following units: an acquisition unit configured to acquire information about a lens, a motion vector detection unit configured to detect a motion vector from a plurality of images captured by the image capture unit, and a calculation unit configured to calculate an image blur correction amount for correcting an image blur, on the basis of the motion vector detected by the motion vector detection unit, and a shake of an image capturing apparatus detected by a shake detection unit for detecting the shake of the image capturing apparatus, wherein the calculation unit changes weights applied to the motion vector and the shake of the image capturing apparatus for calculation of the image blur correction amount, on the basis of information related to perspective of the lens acquired by the acquisition unit, wherein the motion vector detection unit divides an image captured by the image capture unit into a plurality of areas, and calculates a single global vector as the motion vector, using local motion vectors obtained in the respective divided areas, and wherein the calculation unit applies a weight depending on a size of a projection of a local motion vector on a line radially extending from an optical axis as a center, to the local motion vector.

12. A method for controlling an image stabilization apparatus, the method comprising:
acquiring information about a lens;

detecting a motion vector from a plurality of images captured by an image capture unit for capturing an object image; and calculating an image blur correction amount for correcting an image blur, on the basis of the motion vector detected in the motion vector detection, and a shake of an image capturing apparatus detected by a shake detection unit for detecting the shake of the image capturing apparatus, wherein the calculation includes changing weights applied to the motion vector and the shake of the image capturing apparatus for calculation of the image blur correction amount, on the basis of information related to perspective of the lens acquired in the acquisition, wherein the motion vector detection divides an image captured by the image capture unit into a plurality of areas, and calculates a single global vector as the motion vector, using local motion vectors obtained in the respective divided areas, and wherein the calculation applies a weight depending on a size of a projection of a local motion vector on a line radially extending from an optical axis as a center, to the local motion vector.

* * * * *